UNITED STATES PATENT OFFICE.

ALEXANDER P. ANDERSON, OF CHICAGO, ILLINOIS.

ART OF TREATING MAIZE OR INDIAN CORN.

990,093.

Specification of Letters Patent.  Patented Apr. 18, 1911.

No Drawing.

Application filed August 15, 1904. Serial No. 220,873.

*To all whom it may concern:*

Be it known that I, ALEXANDER P. ANDERSON, citizen of the United States, residing at 6022 Monroe avenue, Chicago, Illinois, have invented certain new and useful Improvements in the Art of Treating Maize or Indian Corn; and I do hereby declare the following to be a full, clear, and exact description of the invention, such as will enable others skilled in the art to which it appertains to make and use the same.

My invention relates to the art of treating maize or Indian corn and it is applicable to all of the varieties of Indian corn. Moreover, said invention is applicable either to the whole grain or to the same in a comminuted form.

The object of my invention is to provide a dry method of swelling the corn, and at the same time degerminating and hulling the same in order to obtain a product which is peculiarly adapted for distilling purposes, besides furnishing a palatable, readily digestible food product.

This invention involves a special application of my process which I have described in detail in my Letters Patent of the United States, No. 707892, and dated August 26, 1902. I have found that the treatment therein described is well adapted to the treatment of every description of maize or Indian corn not only in its whole condition, but also in the form of the comminuted grain.

Heretofore one particular variety of corn, namely what is known as "pop-corn", has been expanded or swelled by a dry method of roasting the same. However, this method could only be carried out with this particular species of corn in the form of the whole grain. It could not be applied to any other species of Indian corn or to the pop-corn in a broken or comminuted form. The reason of this, as I have ascertained, is due to the peculiar nature and structure of the endocarp, which is corneous, and of the hull or pericarp of the species "pop-corn" which prevents the granule-liquid in the starch-granules from forming into gas or steam under the action of heat until a pressure sufficient to cause such gas or steam to be suddenly or violently formed is attained, whereupon the pericarp or hull gives way and the starch-granules of the grain are broken up, resulting in the everted and swelled or fluffy condition characteristic of popped corn. This characteristic property is confined to "pop-corn" and is not shared by any other species or variety of Indian corn.

The advantage which results in a puffing rather than a "popping" and everting of the corn of my process is that in manufacturing such puffed corn, I am not confined to this comparatively expensive species of corn, but that I may employ for this purpose any species or variety of corn and moreover, I may employ for said purpose not only the whole unhulled grain but every form of comminuted hulled or unhulled corn, such as pearl-hominy, corn grits and the like. Moreover, the great objection to popped corn as now manufactured is that it cannot be produced in an unhulled condition, an objection inherent in the present mode of manufacturing the same, which, as above stated is inseparable from the use of the unhulled grains of pop-corn. In such corn popped by the old method the swelled and everted interior of the kernel inevitably envelops to a greater or less extent the fractured pericarp or hull in such a way that it cannot be removed. This hull or pericarp is indigestible and otherwise objectionable, and hence it has always been a desideratum to devise a method whereby a hulled popped corn could be obtained.

All the above disadvantages of the old method of making popped corn are effectually done away with by my invention, which furnishes a readily available and practical method of producing hulled puffed corn (as contradistinguished from popped or everted corn) from every species or variety of corn both in the form of the whole grain and in a comminuted condition.

In carrying out my invention I preferably heat any species or variety of corn or a mixture of them in the form of the whole unhulled grain or in a comminuted hulled or unhulled form or in the form of a mixture of any or all of them (all of which conditions are in the claims comprised under the term "Indian corn"), under gas pressure, such for example, as air pressure and in a substantially air dry condition, to a point above the boiling point of the liquid contained in the starch-granules of the corn at normal atmospheric pressure, or, what is practically the same thing, above the boiling point of water at normal atmospheric pressure, for a period of time not long enough to permit the escape of too much of the granule liquid through the granule-coatings by diffusion. As in my aforesaid patent, the corn must be heated for a period of time not too long to char the corn and not too short to complete the operation. The time is largely governed by the nature of each case and the taste to be given the product. I thereupon, while substantially maintaining the said temperature, reduce, that is to say, partly or entirely remove, the pressure from the corn with such rapidity that the granule-liquid will suddenly burst or flash into gaseous form or steam, which will result in an instantaneous expansion or explosion of the entire mass of the corn into several times its original volume, the said corn being evenly and homogeneously swelled into a very porous mass. This expansion is such that each of the grains of corn or fragments of the comminuted corn preserves its exact original shape, and becomes a very much enlarged and porous copy of the original body, provided the heat applied will be sufficient to render the granule-material sufficiently coherent after the explosion. The important point under all conditions is to heat the corn under substantially dry gas pressure, e. g. air pressure, and thereafter, while the same is thus heated, to suddenly reduce said pressure, for example suddenly opening the hermetically closed receptacle in which it was heated, sufficiently below the point at which the liquid boils at the temperature imparted, to cause the same to suddenly gasify.

My invention, therefore, broadly considered, consists in heating Indian corn in a substantially air dry state to a certain temperature under a substantially dry gas pressure and then quickly reducing the pressure to a point below that at which the granule-liquid contained in the starch of the same boils at said temperature.

My invention also consists in the product resulting from this treatment and in such other features, methods and steps as will hereinafter be described and pointed out in the claims.

I will now proceed to describe the manner of carrying out my invention in its preferred form.

The corn to be treated may be any species or variety of Indian corn or a mixture of several species or varieties, and may be in the form of the whole grain or in a comminuted or broken condition such as corn-grits, pearl-hominy or the like, or a mixture of any or all of the forms of the whole and broken grains. This corn in its normal air-dry state I introduce into a suitable receptacle, such as a rotary cylinder sufficiently strong to withstand the internal gas pressure to which the corn is subjected, the amount introduced being sufficient to fill such cylinder from one-third to three-fourths full. This cylinder which is arranged within or is adapted to be introduced into an oven is then hermetically sealed and rotated in the oven. The temperature in the oven should be from 200° to 300° C., and at this temperature the cylinder is to be rotated and remain closed for from one-half to two hours, during which time a pressure of about from 75 to 150 pounds to the square inch, corresponding to from five to ten atmospheres is produced within the cylinder. The corn under these conditions should attain a temperature not substantially less than 150° C., nor more than 250° C., which I find to be the proper temperatures, to effect the proper puffing without charring. This resultant interior pressure is, of course, a function of or dependent on the oven temperature. If the oven is kept at the highest temperature (300° C.) a pressure of about 150 pounds to the square inch or ten atmospheres will result in about forty-five minutes, by the expansion of the air within the cylinder. When the temperature of the oven is kept lower, say at 200° C., the period of time necessary to work up a pressure of ten atmospheres would be correspondingly larger, say from one to two hours. The period of time necessary to work up to a certain desired pressure also depends upon the amount of material introduced into the cylinder. Thus when the cylinder is one-third full the desired pressure—say 125 pounds—is reached more rapidly than when the cylinder is say three-fourths full. This of course naturally follows from the fact that the more material there is within the cylinder, the longer it takes to heat such material up to the same temperature and that the gas pressure within the cylinder rises with the temperature. The time of treating the corn, the temperature of the oven and the amount of material to be put into the cylinder are dependent upon the nature of the material and the character of the oven and must be determined by practice. The same is true of the most desirable pressure to be applied in each case to produce the best results.

When the material has been treated as explained above and a pressure of from 100 to 150 pounds to the square inch has been attained the receptacle or cylinder is suddenly opened, thus quickly reducing the pressure of the confined air to normal. The result will be a practically instantaneous swelling of the corn thus treated so that the same has a greatly increased volume. In view of this sudden swelling it is important either to employ a receptacle whose capacity is sufficient to contain the corn, when swollen, or to provide means for the quick discharge or ejection of the same from the vessel when the latter is opened, in order to allow sufficient space for the swelling of the corn at the moment of the reduction of the pressure.

The following examples will show in detail how my invention may be carried out in practice in what I consider its preferred form:

Example 1: I fill a cylinder such as described in my aforesaid patent and provided with means to rotate the same two-thirds full with shelled yellow dent corn in its normal air-dry condition. The cylinder which was used by me was of cast bronze, was four feet long and six inches in diameter on the inside, while its walls were one-half inch thick. After being filled with the corn as aforesaid, the lid is secured on the cylinder in such a way as to form a hermetic closure and the cylinder is then rotated inside an oven whose initial temperature is 250° C., for somewhat less than one hour, say 47 minutes, the temperature of the oven rising during that period to about 280° C., and the corn which was introduced at normal temperature attaining a temperature of about 171° C. The temperature of the corn is indicated and ascertained during the process by a thermometer extending into the cylinder and into contact with the corn. Under these conditions the pressure in the cylinder was found to rise from normal atmospheric to 140 pounds per square inch. The cylinder is opened quickly, by quickly releasing the lid at the end of the above stated period, whereupon the corn will suddenly expand or be puffed up to from 6 to 10 times its original volume, the individual grains of the same preserving substantially their original shape, the hull being thoroughly and effectually loosened and thrown off from the same, so as to require merely a fanning operation to remove said hulls. Moreover, the corn has by this process been thoroughly degerminated, the germs being also readily removed from the mass by a fanning operation.

Example 2: I fill the same cylinder as in Example 1 about two-thirds full with air-dry yellow dent corn and then hermetically seal the same as above and rotate the same in a horizontal position in an oven for about forty minutes, the initial temperature of the oven being 285° C., and at the end of the operation about 290° C., the temperature of the same at the intermediate stages of the operation rising as high as 300° C. The temperature of the material is thus caused to rise from ordinary room temperature to 187° C. and the pressure within the cylinder rises to about 190 pounds to the square inch. At the end of the forty minutes the cylinder is suddenly opened and the pressure as suddenly removed whereby the corn is quickly puffed and discharged from the cylinder, its volume being increased from 8 to 10 times. The hulls are thrown off from the grains and in the majority of such grains the germs, which on account of the absence of starch do not expand, are now also separated from the expanded endosperm so that the corn is not only puffed and hulled but degerminated as well.

Example 3: The same cylinder as in the above examples is filled with 14 quarts of pearl-hominy in its usual air-dry condition. The cylinder is then hermetically sealed and rotated in an oven as above for about 35 minutes, the temperature of the oven rising from 285° C., initial temperature to 305° C., at the end of the operation. The temperature of the material is thereby caused to rise from the normal (about 30° C.) to about 183° C., the pressure in the cylinder rising from atmospheric to 165 pounds at the end of the operation, before being suddenly released. When the pressure is removed by suddenly opening the cylinder, the pearl-hominy puffs up into from 6 to 8 times its original bulk, each particle of the same retaining substantially its original shape, the same being also dehulled and degerminated. If the initial temperature of the oven is made sufficiently high in the first place, no increase in temperature of the oven while the cylinder is within it will be necessary to develop the required pressure in the cylinder.

The products resulting from the process thus disclosed are essentially distinguished by the fact that they are Indian corn which, whether in the shape of the whole grain, or broken up, as in the case of corn-grits, pearl-hominy or the like, exists in hulled, swelled and spongy condition, the structure of the starch-granules of the same being obliterated broken up or disrupted substantially throughout the mass, the hulling being done concurrently with the swelling. They are thus radically distinguished from ordinary pop-corn, as made according to the old methods, wherein the entire hull or glume is retained and enveloped by the expanded endosperm. As is well recognized, this is a very objectionable feature in this article. Pop-corn expanded according to my method is rendered unobjectionable in this particular inasmuch as the hull is thrown off and easily removed by fanning or the like.

As a matter of fact all species and forms of unhulled corn treated according to my invention are hulled coincidently with the expansion, the hull or husk not expanding and being, therefore, thrown off by the sudden expansion of the endosperm. It is only owing to the peculiar nature of the hull and corneous endocarp of pop-corn that it has been possible to swell the same by the dry method hitherto known; no other variety or species of Indian corn has heretofore been susceptible to such expansion and I have been the first to puff Indian corn of all kinds and also to puff or explode pop-corn in a more perfect manner than hitherto attainable.

Another result of my process is where unhulled corn, or corn retaining the inner bran-coating or aleurone layer, or layer of aleurone cells employed, is that this aleurone which contains the greatest proportion of the protein substances of the grain is retained and covers or dots the ready product in the form of small, irregular spots or patches. An essential nutritive part of the corn is thus retained while the indigestible husks or glumes consisting mainly of cellulose are thrown off, and may be easily fanned or blown away.

Another important characteristic of my new article of manufacture is that the same retains in substance the original shape, though on a greatly enlarged scale, of the original grain or grain-fragment. This is important since it enables the article to be readily identified, thus making adulteration difficult, and makes the same otherwise desirable to consumers. The new products are, moreover, readily identified by microscopic examination, i. e., there are no intact starch-granules present (when the expansion has been complete) and the whole grain becomes a spongy cellular pith-like mass. The original cell-structure of the grain and the structure of the starch-granules contained in the cells have been disrupted and obliterated and a new honeycomb-like structure similar to pith, such as elder-pith, has taken their place, each cell of which is much larger than the original cells and is empty, excepting that it is filled with air. The walls of these honeycomb-like cells or cavities are made up of the particles formed from the ruptured and obliterated starch-granules together with the gluten, fiber and other materials present in the seed before the expansion of the same.

The cavities or new cells in the resultant cereal product are honeycomb-like in that they are sealed, there being no openings between the cells. They are, however, not generally of a uniform size or elongated as in a honeycomb. They resemble the cells of elder-pith when the cell contents of the same have disappeared to such an extent that other tests besides those of the microscope will have to be resorted to, to distinguish between the two. A very effective test for this purpose is the action of water which breaks down and dissolves or emulsifies the cell-membrane of my new serial product while leaving intact the cell-membrane of elder-pith.

The new form of puffed corn thus described may be eaten without further treatment, being readily permeated, emulsified and dissolved by the saliva and gastric juices. It may also be added to soup or dissolved in water to form gruel and the like, or it may be further cooked in a variety of ways.

The enlarged or expanded grains of corn are easily flattened between rollers (e. g. by running them through a wringer or the like) without losing their distinguishing characteristics and without changing them structurally, the cells or cavities being merely flattened. In this flattening there is no fusion of cavity-walls, etc., so that a microscopic examination would disclose the same structure as in cereal grains according to my invention which have not been flattened or compressed. The expanded cereals could when crisp also be ground into a flour which could be used for purposes of nourishment by simply adding water or milk.

The degerminating action which takes place under this process, is a radically new one, and for the purposes corn is used, an important one. Thus it is a well known fact that the oil in the germ of cooked corn will turn rancid in time. Also when corn is used for distilling purposes in the manufacture of denatured alcohol (an important industry) a degerminated corn is essential. By this process the germs, after the process, can be used separately for the extraction of oil, etc., immediately, since the germs are in a dry condition and not mixed with water which is the case when corn is separated from its germs by the usual methods of "floating" in starch manufacture.

What I claim and desire to secure by Letters Patent of the United States is:

1. The process of producing a degerminated Indian corn product, which consists in heating substantially air-dry unhulled Indian corn to a temperature of between 150° and 250° centigrade in an air-tight vessel, whereby pressure in excess of atmospheric pressure is produced within said vessel, then suddenly reducing said pressure to atmospheric pressure and discharging the corn from said vessel, whereby the corn is hulled and the germs are separated from the same.

2. The process of producing a degerminated Indian corn product which consists in heating substantially air-dry unhulled Indian corn to about 187° C., in an air-tight vessel, whereby a pressure is produced in said vessel, and then suddenly discharging the corn from said vessel, whereby the pressure is suddenly released and the hulls and germs are thrown off, and then separating the hulled degerminated corn from the hulls and germs.

3. As a new article of manufacture, hulled degerminated dry spongy corn, the structure of whose starch granules has been disrupted substantially throughout its mass, the remains of said starch granules being contained in the cell-walls of the new article, the said cell-walls being readily dissolved or broken down in water.

In testimony whereof I affix my signature to this specification, in the presence of two witnesses.

ALEXANDER P. ANDERSON.

Witnesses:
 FRANK L. ANDERSON,
 THOMAS J. EVANS.